(12) United States Patent
Lavedas et al.

(10) Patent No.: US 7,675,454 B2
(45) Date of Patent: Mar. 9, 2010

(54) SYSTEM, METHOD, AND COMPUTER PROGRAM PRODUCT PROVIDING THREE-DIMENSIONAL VISUALIZATION OF GROUND PENETRATING RADAR DATA

(75) Inventors: Steven Lavedas, Manassas, VA (US); Ajay Patrikar, Herndon, VA (US); Mark Hibbard, Arlington, VA (US)

(73) Assignee: Niitek, Inc., Sterling, VA (US)

( * ) Notice: Subject to any disclaimer, the term of this patent is extended or adjusted under 35 U.S.C. 154(b) by 392 days.

(21) Appl. No.: 11/852,030

(22) Filed: Sep. 7, 2007

(65) Prior Publication Data

US 2009/0295617 A1    Dec. 3, 2009

(51) Int. Cl.
    *G01S 13/88* (2006.01)
(52) U.S. Cl. .................. 342/22; 342/27; 342/179; 342/180; 342/185; 342/197
(58) Field of Classification Search ............ 342/22, 342/27, 176, 179–183, 185, 195, 197
See application file for complete search history.

(56) References Cited

U.S. PATENT DOCUMENTS

| | | | |
|---|---|---|---|
| 3,639,784 A | 2/1972 | Kelleher, Jr. | |
| 4,070,673 A * | 1/1978 | Schmidt et al. | 342/90 |
| 4,438,404 A | 3/1984 | Philipp | |
| 4,439,765 A * | 3/1984 | Wilmot | 342/58 |
| 4,581,715 A | 4/1986 | Hyatt | |
| 4,590,614 A | 5/1986 | Erat | |
| 4,591,858 A * | 5/1986 | Jacobson | 342/169 |
| 4,678,345 A | 7/1987 | Agoston | |
| 4,686,655 A | 8/1987 | Hyatt | |
| 4,715,000 A | 12/1987 | Premerlani | |
| 4,760,525 A | 7/1988 | Webb | |
| 4,833,475 A * | 5/1989 | Pease et al. | 342/185 |
| 5,003,562 A | 3/1991 | van Driest et al. | |
| 5,053,983 A | 10/1991 | Hyatt | |
| 5,115,245 A | 5/1992 | Wen et al. | |
| 5,192,886 A | 3/1993 | Wetlaufer | |

(Continued)

FOREIGN PATENT DOCUMENTS

CA    2266222    9/1999

(Continued)

OTHER PUBLICATIONS

Office Action issued in U.S. Appl. No. 11/292,433 mailed Nov. 24, 2008.

(Continued)

*Primary Examiner*—John B Sotomayor
(74) *Attorney, Agent, or Firm*—DLA Piper LLP (US)

(57) ABSTRACT

A system for analyzing and displaying radar information comprises: a transmit and receive unit operable to transmit radar signals to a survey volume and to receive radar returned radar signals, a processing unit operable to: receive radar data from the returned radar signals, reduce the data into depth bins, each with a score based on received signal strength, create connections among depth bins based on respective scores, and to eliminate ones of the depth bins that do not meet a threshold number of connections, the system further comprising a display unit operable to create a display of at least a subset of the depth bins that are not eliminated by the processing unit.

22 Claims, 9 Drawing Sheets

U.S. PATENT DOCUMENTS

| | | | |
|---|---|---|---|
| 5,243,343 | A | 9/1993 | Moriyasu |
| 5,315,627 | A | 5/1994 | Draving |
| 5,351,055 | A * | 9/1994 | Fujikawa et al. ............ 342/184 |
| 5,386,215 | A | 1/1995 | Brown |
| 5,420,531 | A | 5/1995 | Wetlaufer |
| 5,420,589 | A | 5/1995 | Wells et al. |
| 5,424,735 | A | 6/1995 | Arkas et al. |
| 5,444,459 | A | 8/1995 | Moriyasu |
| 5,451,894 | A | 9/1995 | Guo |
| 5,495,260 | A | 2/1996 | Couture |
| 5,510,800 | A | 4/1996 | McEwan |
| 5,523,760 | A | 6/1996 | McEwan |
| 5,552,793 | A | 9/1996 | McLeod et al. |
| 5,661,490 | A | 8/1997 | McEwan |
| 5,748,153 | A | 5/1998 | McKinzie, III et al. |
| 5,805,110 | A | 9/1998 | McEwan |
| 5,900,761 | A | 5/1999 | Hideno et al. |
| 5,900,833 | A | 5/1999 | Sunlin et al. |
| 5,939,912 | A | 8/1999 | Rehm |
| 5,969,667 | A | 10/1999 | Farmer et al. |
| 5,986,600 | A | 11/1999 | McEwan |
| 6,002,723 | A | 12/1999 | Chethik |
| 6,055,287 | A | 4/2000 | McEwan |
| 6,137,433 | A | 10/2000 | Zavorotny et al. |
| 6,150,863 | A | 11/2000 | Conn et al. |
| 6,211,814 | B1 * | 4/2001 | Benjamin et al. ........... 342/185 |
| 6,239,764 | B1 | 5/2001 | Timofeev et al. |
| 6,249,242 | B1 | 6/2001 | Sekine et al. |
| 6,281,833 | B1 | 8/2001 | Pringle et al. |
| 6,329,929 | B1 | 12/2001 | Weijand et al. |
| 6,342,866 | B1 | 1/2002 | Ho et al. |
| 6,345,099 | B1 | 2/2002 | Alvarez |
| 6,433,720 | B1 | 8/2002 | Libove et al. |
| 6,501,413 | B2 | 12/2002 | Annan et al. |
| 6,538,614 | B2 | 3/2003 | Fleming et al. |
| 6,580,304 | B1 | 6/2003 | Rieven |
| 6,650,661 | B1 | 11/2003 | Buchanan et al. |
| 6,657,577 | B1 | 12/2003 | Gregersen et al. |
| 6,680,634 | B1 | 1/2004 | Ruha et al. |
| 6,690,741 | B1 | 2/2004 | Larrick, Jr. et al. |
| 6,694,273 | B2 | 2/2004 | Kurooka et al. |
| 6,726,146 | B2 | 4/2004 | Li et al. |
| 6,778,000 | B2 | 8/2004 | Lee et al. |
| 6,798,258 | B2 | 9/2004 | Rieven |
| 6,836,239 | B2 * | 12/2004 | Scott ......................... 342/176 |
| 6,845,458 | B2 | 1/2005 | Lin |
| 6,845,459 | B2 | 1/2005 | Lin |
| 6,853,227 | B2 | 2/2005 | Laletin |
| 6,853,338 | B2 | 2/2005 | McConnell |
| 6,864,833 | B2 | 3/2005 | Lyon |
| 6,868,504 | B1 | 3/2005 | Lin |
| 6,885,343 | B2 | 4/2005 | Roper |
| 6,912,666 | B2 | 6/2005 | Lin |
| 6,914,468 | B2 | 7/2005 | Van Dijk et al. |
| 6,930,528 | B2 | 8/2005 | Ajit |
| 6,956,422 | B2 | 10/2005 | Reilly et al. |
| 7,020,794 | B2 | 3/2006 | Lin |
| 7,026,850 | B2 | 4/2006 | Atyunin et al. |
| 7,026,979 | B2 | 4/2006 | Khosla |
| 7,037,266 | B2 | 5/2006 | Ferek-Petric et al. |
| 7,042,385 | B1 | 5/2006 | Wichmann |
| 7,053,814 | B2 | 5/2006 | Yap |
| 7,157,952 | B2 | 1/2007 | Avants et al. |
| 7,161,531 | B1 * | 1/2007 | Beazell ....................... 342/176 |
| 7,203,600 | B2 | 4/2007 | Keers et al. |
| 2002/0000946 | A1 | 1/2002 | Portin |
| 2003/0043078 | A1 | 3/2003 | Deng et al. |
| 2003/0179025 | A1 | 9/2003 | Partsch et al. |
| 2004/0036655 | A1 | 2/2004 | Sainati et al. |
| 2004/0090373 | A1 | 5/2004 | Faraone et al. |
| 2004/0111650 | A1 | 6/2004 | Chen |
| 2004/0178838 | A1 | 9/2004 | Ngo et al. |
| 2005/0200549 | A1 | 9/2005 | Thompson et al. |
| 2005/0237260 | A1 | 10/2005 | Bancroft |
| 2005/0286320 | A1 | 12/2005 | Iwasaki |
| 2006/0038598 | A1 | 2/2006 | Reilly et al. |
| 2006/0038599 | A1 | 2/2006 | Avants et al. |
| 2006/0087471 | A1 | 4/2006 | Hintz |
| 2006/0119407 | A1 | 6/2006 | Abrosimov |
| 2006/0132210 | A1 | 6/2006 | Kong et al. |
| 2006/0203613 | A1 | 9/2006 | Thomsen et al. |
| 2006/0256025 | A1 | 11/2006 | Askildsen |
| 2007/0080864 | A1 | 4/2007 | Channabasappa |
| 2008/0001808 | A1 * | 1/2008 | Passarelli et al. .......... 342/26 R |

FOREIGN PATENT DOCUMENTS

| | | | |
|---|---|---|---|
| EP | | 615137 A2 * | 9/1994 |

OTHER PUBLICATIONS

Final Office Action issued in U.S. Appl. No. 11/260,038 dated Feb. 5, 2009.

International Search Report issued in PCT/US08/064552 on Jul. 7, 2009.

Written Opinion issued in PCT/US08/064552 on Jul. 7, 2009.

Press et a., "Numerical Recipes in C: The Art of Scientific Computing—2nd", Cambridge University Press, Jan. 1, 1992.

Kim et al., "A Resistive Linear Antenna for Ground-Penetrating Radars", 2004, pp. 359-370, vol. 5415, proceedings of SPIE.

Kim et al., "Design of a Resistively Loaded Vee Dipole for Ultrawide-Band Ground-Penetrating Radar Applications", Aug. 2005, pp. 2525-2532, vol. 53, No. 8, IEE Transactions on Antennas and Propagation.

Kim et al., "Design and Realization of a Discretely Loaded Resistive Vee Dipole for Ground-Penetrating Radars", Jul. 2004, pp. 1-9, vol. 39, Radio Science.

Montoya, Thomas P., "Vee Dipole Antennas for use in Short-Pulse Ground-Penetrating Radars", Mar. 1998; Georgia Institute of Technology.

Kim et al., Design and Realization of a Discretely Loaded Resistive Vee Dipole on a Printed Circuit Board, 2003, pp. 818-829, vol. 5089, Proceedings of SPIE.

Montoya et al., Land Mine Detection Using a Ground-Penetrating Radar Based on Resistively Loaded Vee Dipoles, Dec. 1999, pp. 1795-1806, vol. 47, No. 12, IEEE Transactions on Antennas and Propagation.

Whiteley, et al., 50 GHz Sampler Hybrid Utilizing a Small Shockline and an Internal SRD, 1991, pp. 895-898, IEEE Microwave Theory & Technique-S Digest.

Tek Sampling Oscilloscopes Technique Primer 47W-7209, October 2989, pp. 1-4, Tektronix, Inc.

Office Action issued in related U.S. Appl. No. 11/260,038 mailed Oct. 17, 2007.

Office Action issued in related U.S. Appl. No. 11/260,038 mailed Mar. 17, 2007.

Office Action issued in related U.S. Appl. No. 11/260,038 mailed Aug. 6, 2008.

Wikipedia, the free encyclopedia, "Field-Programmable Gate Array," Internet Brief, "http://en.wikipedia.org/wiki/FPGA," search date Sep. 27, 2006, 7 pgs.

Office Action issued in related U.S. Appl. No. 11/754,136 mailed May 12, 2008.

Daniels, Jeffrey J. et al., "Ground Penetrating Radar for Imaging Archeological Objects," Proceedings of the New Millennium International Forum on Conservation of Cultrual Property, Dec. 5-8, 2000, pp. 247-265, edited by Suckwon Choi and Mancheol Suh, Institute of Conservation Science for Cultural Heritage, Kongju National Universiity, Kongju, Korea.

Kinlaw, Alton E. et al., "Use of Ground Penetrating Radar to Image Burrows of the Gopher Tortoise (*Gopherus polyphemus*)," Herpetological Review, 2007, pp. 50-56, vol. 38, No. 1, Society for the Study of Amphibians and Reptiles.

"Energy Focusing Ground Penetrating Radar (EFGPR) Overview," Jan. 28, 2003, pp. 1- 12, Geo-Centers, Inc.

Office Action issued in U.S. Appl. No. 11/754,152, mailed Oct. 21, 2008.
International Search Report issued in International Application No. PCT/US2008/72303, mailed Oct. 22, 2008.
Written Opinion issued in International Application No. PCT/US2008/72303, mailed Oct. 22, 2008.
International Search Report issued in Application No. PCT/US2008/064541 mailed Nov. 4, 2008.
Written Opinion issued in Application No. PCT/US2008/064541 mialed Nov. 4, 2008.
International Search Report issued in Application No. PCT/US2008/072543 mailed Nov. 4, 2008.
Written Opinion issued in Application No. PCT/US2008/072543 mailed Nov. 4, 2008.

* cited by examiner

SYSTEM, METHOD, AND COMPUTER PROGRAM PRODUCT PROVIDING THREE-DIMENSIONAL VISUALIZATION OF GROUND PENETRATING RADAR DATA

TECHNICAL FIELD

The present description relates, in general, to techniques for analyzing and displaying radar information.

BACKGROUND OF THE INVENTION

Modern Ground Penetrating Radar (GPR) systems typically analyze and display radar data for a user to interpret. The data can be displayed to the user in a variety of ways, usually in "waterfall" plots that include a Two-Dimensional (2D) rendering of a most recent scan. However, prior art plots usually take one of three forms—as A-Scans, B-Scans or C-Scans. An A-Scan represents a single channel of a scan, and it is a line trace similar to the display on an oscilloscope. An A-Scan is a one dimensional data set with its progression being in the depth or time dimension. A B-Scan is a 2D slice of either a down-track or a cross-track in the ground (down-track and cross-track are explained in more detail with regard to FIG. 9). B-scans are often textured or color mapped. A C-Scan is similar to what many people call a "plan view" or a "top down view", and it is produced by an algorithm that collapses the received energy up into a 2D representation of energy under the ground as seen from a bird's eye view.

FIG. 9 is an illustration of prior art display 900. Display 900 includes down-track display 901 and cross-track display 902. Display 900 shows the data from a radar system that takes a series of 2D scans over a length. Down-track B-Scan 901 is a single channel of the radar array at various down-track distances as the array moves forward in time. Cross-track B-Scan 920 represents the plane across the width of the linear array at a single down-track distance.

A disadvantage of prior art solutions is that they are not intuitive. For instance, a user often is unable to discern the Three-Dimensional (3D) shape of an anomaly (e.g., a land mine) from prior art displays, such as C-scans and scans 901 and 902. As a result, human radar operators receive much specialized training focusing on how to interpret the 2D images that they see in radar information. Thus, prior art systems tend to require a large training investment, as well as much human interpretation during operation.

An additional disadvantage of prior art systems is that they tend to process an enormous amount of data, making it difficult to produce a 3D display in real-time. For example, a commonly used algorithm, known as the F1 algorithm, reduces received data by dropping, e.g., eighty percent of the data and aggregating the remaining data into units called "depth bins." The F1 algorithm then drops a subset of the depth bins that show a weak return and creates a C-scan therefrom. However, this still leaves enough data to strain the processing power of most military computing systems. As a result, systems that provide real-time radar data rarely are able to generate a 3D display. In fact, 3D GPR displays are currently limited to systems that are not real-time systems, such as archaeological systems that take hours to give final results.

BRIEF SUMMARY OF THE INVENTION

The present invention is directed to systems, methods, and computer program products which analyze data and display data using techniques more advanced than those found in the prior art. For example, according to one embodiment, a method to analyze and display radar data employs a mathematical connection algorithm to further eliminate depth bins and also to derive more useful information from the remaining depth bins. Such further elimination of depth bins may help to limit the amount of data being processed, thereby freeing up some amount of processing power of a computer system.

Additionally or alternatively, other embodiments employ a display wherein a down-track B-scan and a cross-track B-scan are arranged orthogonally to each other to create two sides of a rectangular prism. Within the rectangular prism is a 3D plot of anomaly data. Some embodiments include a more intuitive down-track B-scan that selects channels of interest over time to create a 2D view of what is generally expected to be the most relevant data from a survey volume. The creation of the down-track B-scan can be enhanced by using an algorithm that smoothes the movement from one scan to the next, thereby helping to focus the B-scan on items of interest while minimizing abrupt shifts due to high frequency noise. Such displays tend to be more intuitive to human users than the displays of the prior art, at the very least, due to the rendering of more relevant data in a 3D plot, often in real-time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
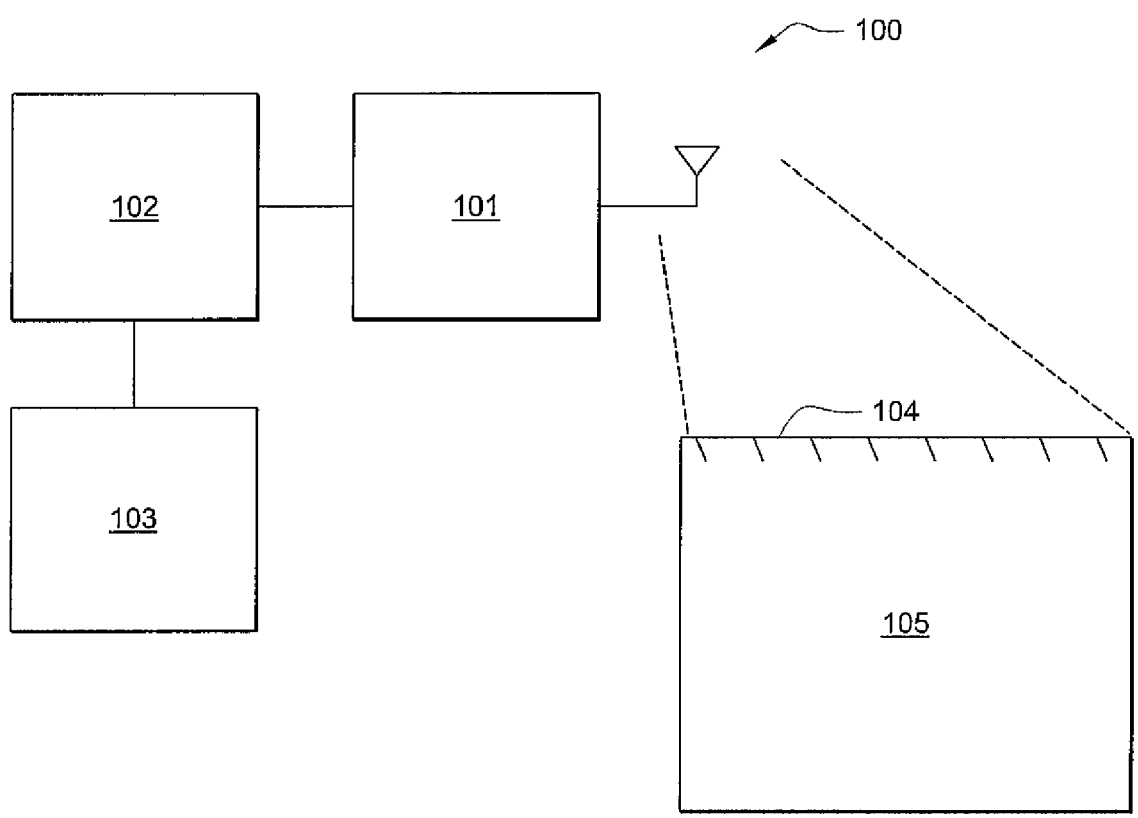
FIG. 1 is an illustration of an exemplary system adapted according to one embodiment of the invention.

FIG. 1 is an illustration of exemplary system 100 adapted according to one embodiment of the invention. System 100 includes transmitter/receiver (Tx/Rx) unit 101, processing unit 102, and display unit 103 and is operable to produce a real-time Three-Dimensional (3D) radar display.

Tx/Rx unit 101 includes a plurality of elements that radiate radar signals and receive returned signals. In some embodiments, transmitter and receiver elements may be separate or may be integrated, e.g., transceiver elements. In this example, system 100 is a Ground Penetrating Radar (GPR) system, and its radiation is focused on ground survey area 104. The radiation penetrates the ground and provides data with regard to survey volume 105.

In this example, the transmitter/receiver elements are arranged in one or more linear arrays parallel to the ground, with each of the elements corresponding to a portion of the width of survey area 104. Further, in GPR systems, the time between a transmit pulse and a receive pulse gives the depth of the radar sample. Each of the transmit/receive elements captures a series of pulses over a time period in order to provide the depth of survey volume 105.

Figure 4:
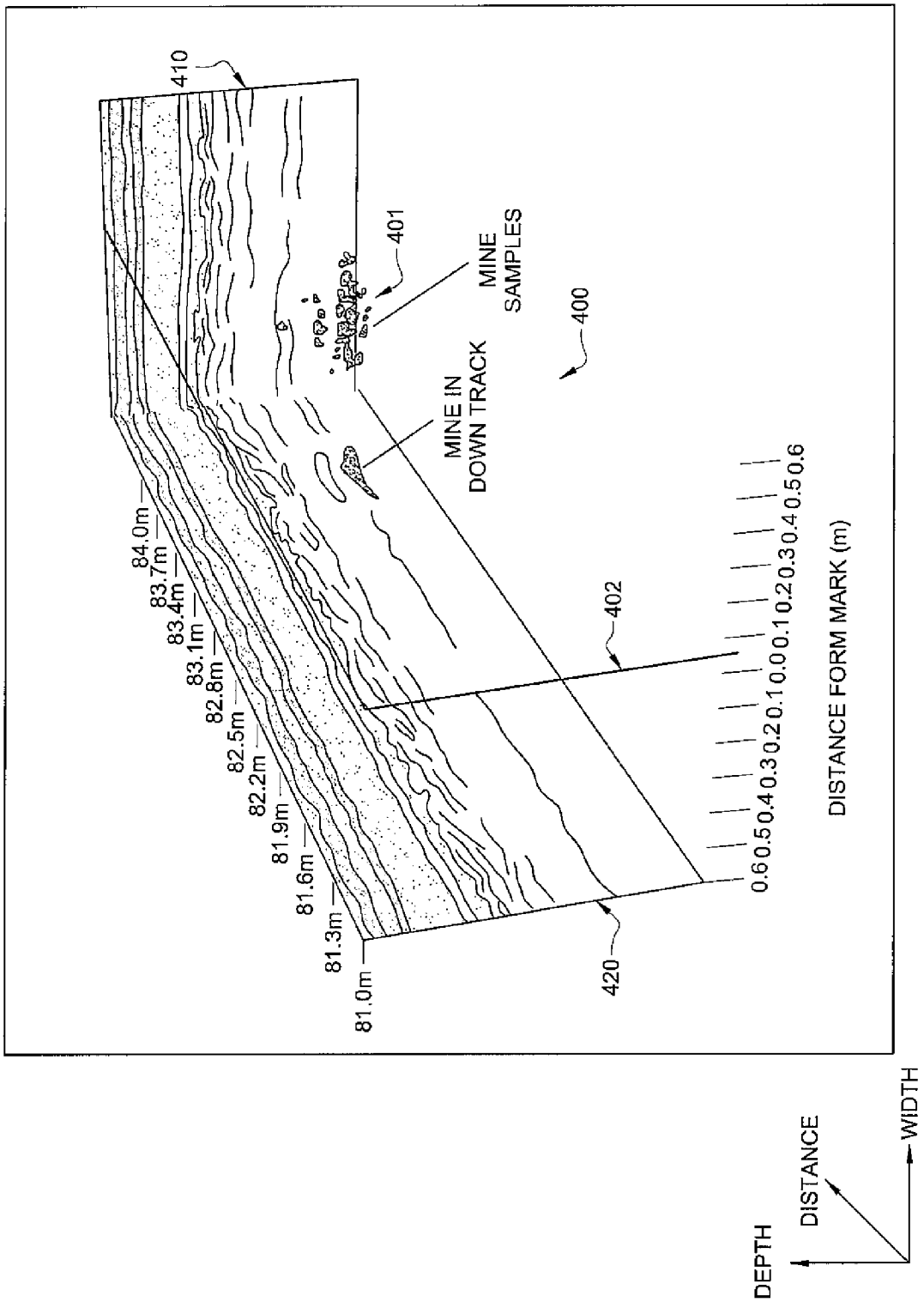
FIG. 4 is an illustration of an exemplary display, adapted according to one embodiment of the present invention.
Figure 5:
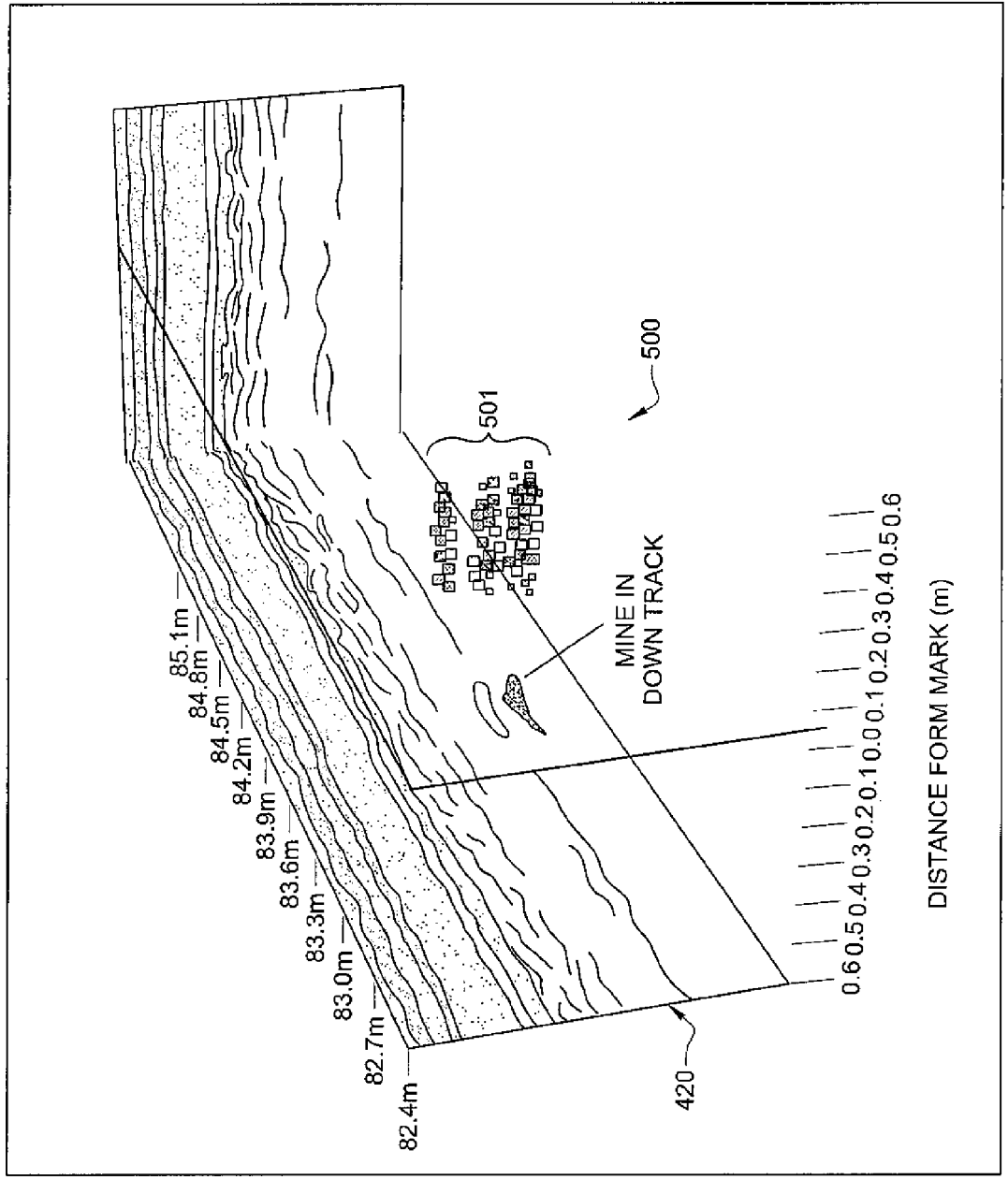
FIG. 5 is an illustration of an exemplary display adapted according to one embodiment of the invention.
Figure 9:
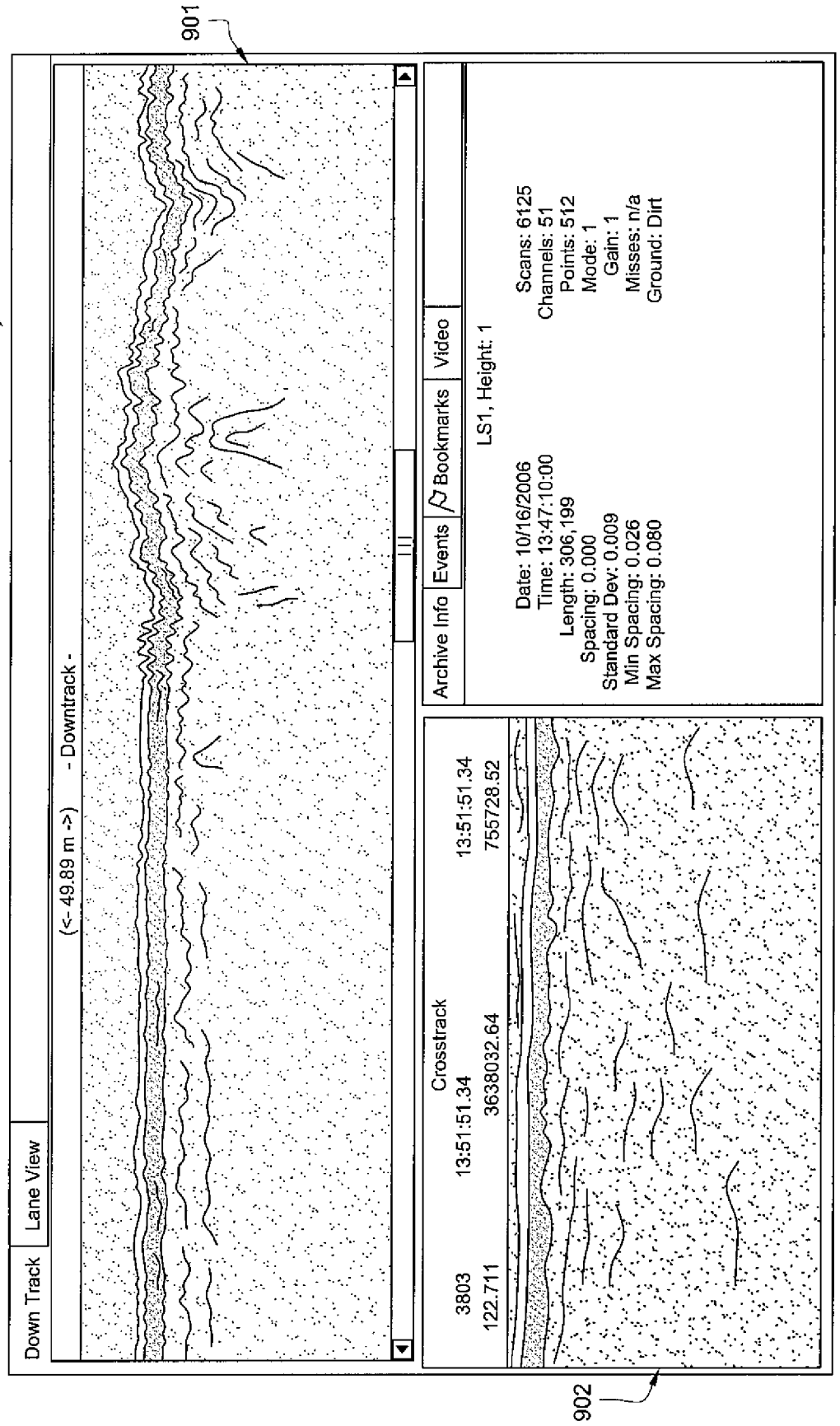
FIG. 9 is an illustration of prior art display.

Each of the captured pulses may be referred to as a "sample." A series of pulses captured by the same transmit/receive element over a depth range may be referred to as a "channel." The collection of channels for each of the transmit/receive elements may be referred to as a "scan." A scan is shaped like a curtain—essentially Two-Dimensional (2D) and covering the width and depth of survey volume 105. A scan can be rendered to show a 2D cross section of volume 105, as shown in FIGS. 4, 5, and 9. System 100 can be placed on a moveable platform, such as on a vehicle, so that additional scans can be taken to traverse the length dimension of survey volume 105. Additionally or alternatively, unit 101 may be tilted up or down with respect to the ground in order to cover the length dimension of survey volume 105.

Processing unit 102 receives the returned signals from Tx/Rx unit 101 and performs various algorithms on the data in order to derive useful information therefrom, as well as to create image data to be displayed on display 103. Processing unit 102 decreases the number of samples in the returned signals so that the information therein can be processed with speed, while at the same time retaining enough data to provide an adequate degree of resolution so that smaller items of interest can be identified. Processes for decreasing the number of samples are discussed further below.

Figure 2:
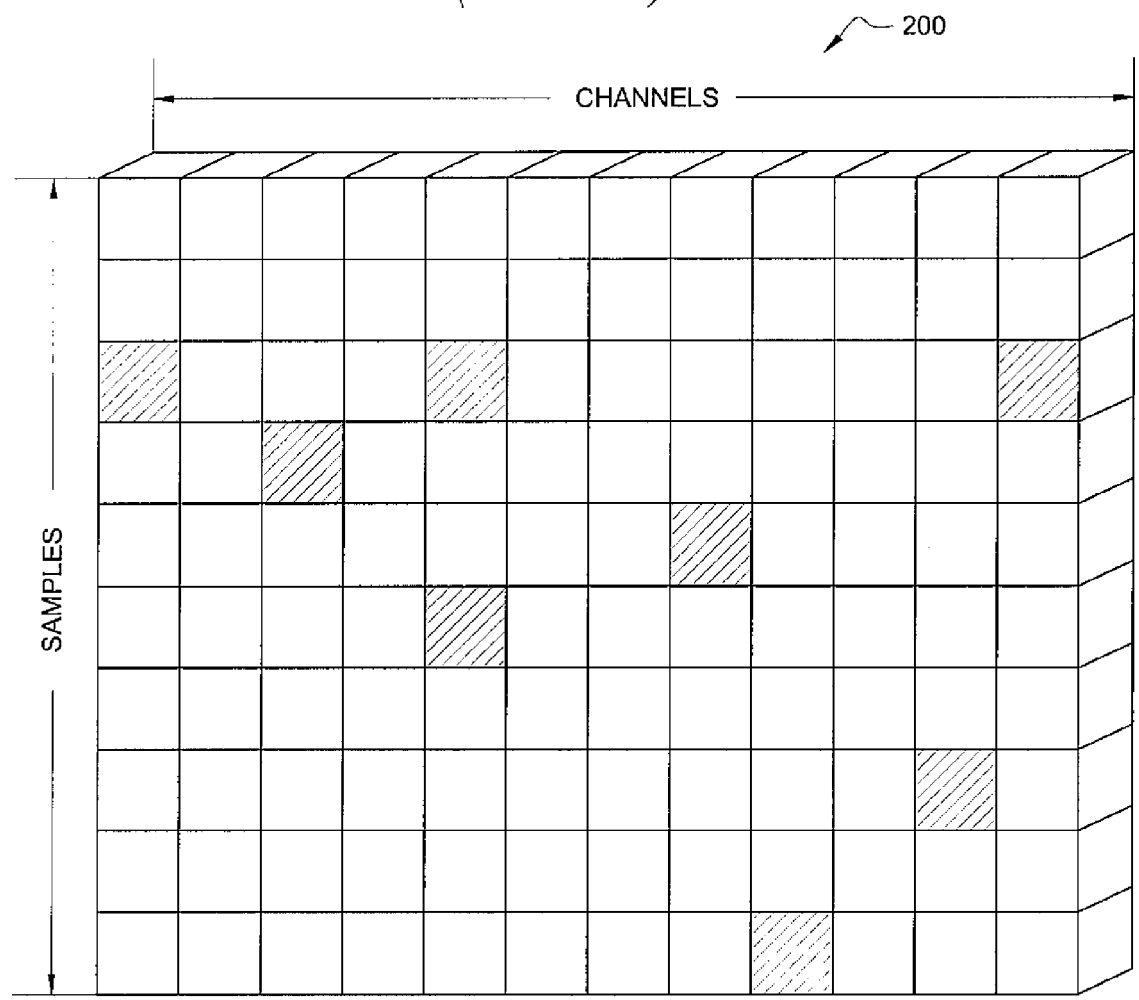
FIG. 2 is an illustration of an exemplary scan, which is common to conventional GPR systems.

FIG. 2 is an illustration of exemplary scan 200, which is common to conventional GPR systems. In scan 200, the individual samples are represented as rectangular prisms, with twelve channels across and ten samples down in each channel. However, the dimensions of scan 200 are for convenience of illustration only, as a scan taken by a real-world GPR system is likely to be at least one or two orders of magnitude larger than that shown in FIG. 2.

In scan 200, some samples are stronger than others. In general, a stronger return indicates a more reflective object in a portion of the survey volume that corresponds to the sample; however, no scan is ideal, as most scans will include some amount of noise that manifests itself as strong samples.

To aid in understanding the radar data, an analogy may be useful. A single scan (e.g., scan 200) can be thought of as being similar to a playing card. If the card is divided into a grid of equal sized blocks, each block can each be imagined as a sample point. If many cards are stacked into a deck, an observer can only see the first card in the front and the tops of the rest of the cards. In a deck of playing cards, it is generally known that some portion of the top will be white and, therefore, clear of useful information, so that it is safe to cut a small portion of the tops off from the cards and discard them. In GPR systems, this is analogous to the ground surface. Then, the top edge of each of the playing cards contains a little bit of useful information, such as red or some black, depending on the suit of the card.

Next for each card, a copy is made that is $1/10^{th}$ of the size vertically (i.e., in the depth dimension) such that for every ten grid blocks, the two brightest/strongest colors are detected and added together and drawn in the corresponding block in the copy. The other portions are discarded, as it is assumed that they contain less relevant information. This is equivalent to taking "depth bins" of the data set.

The next step is to discard depth bin data blocks that are still relatively very weak, since they are generally not expected to contain useful information. Thus, an example system filters out depth bin values that are close to zero. To do this the depth bin values are scored using a normalization based on depth that takes into account that deeper samples will generally have a lower value return due to attenuation. Depth bins with normalized scores less than a certain threshold are discarded. In general, this step eliminates much clutter, but still leaves High Frequency (HF) noise as well as small underground features and layers. The above-described steps eliminate much data, but in real-world systems, there is usually still a large amount of data, some of which contains little useful information.

Figure 3:
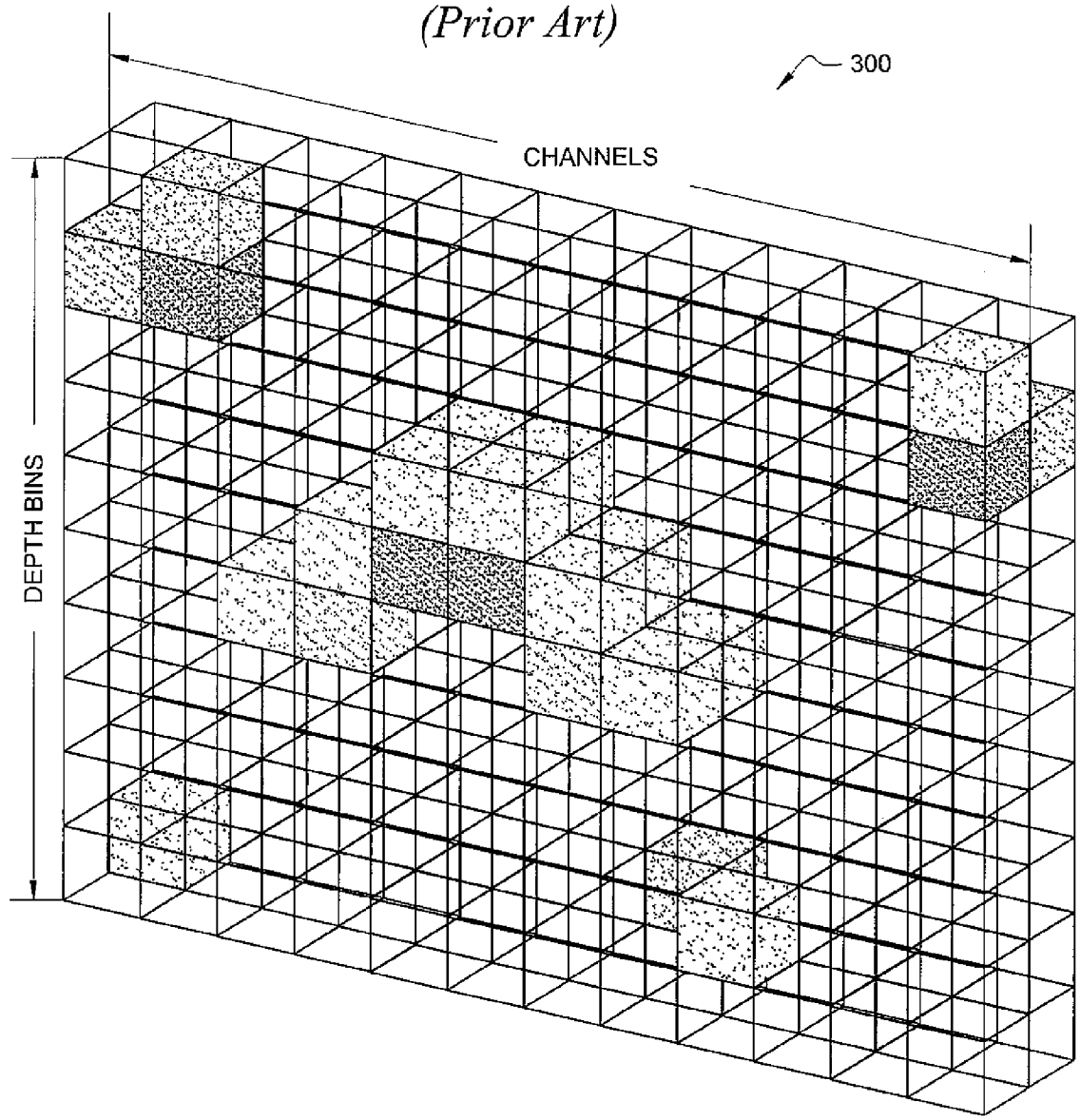
FIG. 3 is an illustration of an exemplary data set, which is common to conventional GPR systems.

FIG. 3 is an illustration of exemplary data set 300, which is common to conventional GPR systems. Data set 300 is a simplified example of two scans after depth binning and eliminating samples with normalized scores less than a given threshold. Data set 300 includes 12 channels across and 10 depth bins down. It should be noted, however, that most real-world data sets generally contain at least 24 channels across and 30 depth bins down. In the blocks shown, the lightest and darkest squares have the highest scores, while the middle colors have lower scores. The blanks are included in FIG. 3 to illustrate depth bins that have been eliminated and will not be present in future figures.

As mentioned above, the depth bins in FIG. 3 are common to conventional GPR systems. Various embodiments of the present invention are operable to eliminate even more depth bins from the data in data set 300 and to derive more useful information from the data.

One example embodiment uses a "connection" algorithm to further analyze the data in data set 300. For instance, for every depth bin that received a score in the above-described process, connections are made to surrounding depth bins based on that score. A depth bin with a score of five, for instance, will be mathematically connected to every depth bin in a sphere of radial distance five or less from itself. The each bin's connections are counted For an individual depth bin, any given connection counts once. However, it does not matter if that connection was initiated to or from that depth bin. For each bin a count is maintained of all the internal connections (i.e., connections identified and established by that depth bin) and external connections (i.e., connections identified and established by a different depth bin) as well as a total number of connected bins. This means a depth bin with a normalized score of as low as one might end up highly connected if nearby depth bins have high scores. In such a scenario most of the connections for the low-scored depth bin are external (i.e., the connections indicate an algorithmic efficiency rather than an actual quality of the depth bin).

It can be seen from this example that even small increases in score can cause large increases in connectivity, thereby helping to show relationships between samples. To connect to depth bins in future scans, this example embodiment generates a delay list that creates a list of depth bins and scores in a given scan so that connections from those depth bins can be applied to depth bins of future scans. As future scans come in, connections from the delay list are applied, and connections from future scans to past scans are applied.

The mathematical connections can be used to filter out noise and subsurface layers in the data display, which can interfere with the detection of items of interest (e.g., mines). The total number of connections for a given depth bin can be compared to a connection threshold. A lower threshold (e.g., eight connections) will tend to filter out most HF noise (which shows up as a vertical column of high value samples in the data) as well as basic clutter. However, subsurface layers and other large features will generally show up, causing difficulty in distinguishing items of interest from background clutter. A bush or other object on the surface can also cause clutter in the display because an algorithm that eliminates everything above ground level is rarely perfect and can be expected to fail to find the ground correctly, and the strong return value of the ground will cause it to connect with a great many nearby samples. By contrast, at a higher threshold (e.g., ~twenty-five) the majority of strong returns (e.g., mines) will be visible while all but the biggest layers and surface features will be thrown away. Weaker and smaller targets will generally not show up.

Various embodiments of the present invention employ a process that adjusts the connection threshold to optimize detection of items of interest while minimizing false positives. In one example, a radar system according to one embodiment of the invention also runs another pre-screener algorithm. An example of such an algorithm is the F1 algorithm, developed by NIITEK™ (based on work by Professor Leslie Collins at Duke University), which is a least-means-squared pre-screener algorithm that produces a C-scan of the same survey volume. Additionally or alternatively, some embodiments may apply other pre-screener algorithms, such as Constant False Alarm Rate (CFAR) algorithms, signal conditioning algorithms, and the like.

In this example, the system uses the F1 algorithm to return deviation values for the various depth bins in the scans. If the F1 algorithm begins to show high deviation for a subsection of the survey volume, the system reduces the connectivity threshold. So if, for example, a current threshold value is fifty, the system can reduce the threshold to twenty-five or fifteen, depending on the deviation value. On the other hand, lower deviation for a subsection may result in an increase of the connectivity threshold. Sharper increases/decreases or high, sustained increases/decreases in deviation may result in greater adjustments of the connectivity threshold.

Accordingly, in this example, as the system progresses from one scan to the next, the system may also adjust the connectivity threshold in order to optimize detection of items of interest. Depth bins that do not have connectivity scores higher than the threshold are not displayed (e.g., discarded, or just simply not displayed). Depth bins that meet or exceed the threshold are provided to a display unit (e.g., unit 103 of FIG. 1) so that they can be rendered in a humanly-perceptible manner. Thus, various embodiments of the invention may use two or more algorithms to determine which depth bins to render to the user.

An advantage of some embodiments of the invention is that they can help to eliminate lag time between the processing of successive scans by employing the delay list, discussed above. The delay list allows systems to continue to create mathematical connections to and from a given scan even after the system has progressed to another scan. In other words, various embodiments of the invention are not limited to processing all or a subset of scans at one time. When taken in combination with the fact that various embodiments also further reduce the data when compared to prior art systems, such feature can be advantageous in that they may allow for the use of less-advanced or less powerful processors. This can be important in, e.g., military applications wherein space is at a premium and/or more complex systems may not be able to withstand the mechanical forces inherent in vehicle-based radar. Further, many embodiments of the present invention can display 3D radar data in real-time. By contrast F1 displays usually lag real-time by at least twenty-four scans.

Various embodiments described above are operable to provide data which indicates the presence of items of interest in a survey volume. While such data can be used with a variety of display techniques, various displays are shown herein that may be especially adapted for the use of such data. FIG. 4 is an illustration of exemplary display 400, adapted according to one embodiment of the present invention. Display 400 includes samples 401, which correspond to data processed according to the technique described above. One particular application of GPR systems is in detecting underground mines, and the example data in display 400 corresponds to a survey volume containing a known mine. Thus in FIG. 4, samples 401 are referred to as "mine samples."

Display 400 also includes cross-track B-scan 410 and down-track B-scan 420 projected orthogonally with respect to each other to create two sides of a rectangular prism. Samples 401 are rendered within the rectangular prism so that they appear in three-dimensional relation to where they correspond in the survey volume. For instance, note that samples 401 appear to be horizontally offset (along the width dimension) with regard to the portion of B-scan 420 that indicates the same mine, yet it has the same depth and distance placement with regard to the mine return in B-scan 410.

Cross-track B-scan 410 is a rendering of the data that is generated by the current scan. Cross-track B-scan 410 can be thought of as a single cross section of the survey volume at a given distance. It is refreshed with each new scan.

Down-track B-scan 420 is a collection of channels, each one taken from a successive scan. However, techniques according to various embodiments of the invention generate down-track B-scan 420 by selecting a channel of interest in each scan, such that down-track B-scan 420 is generally not a true cross-section of the survey volume.

Down-track B-scan 420 reflects the fact that it may not be possible to show every channel at once, such that a choice should be made as to which channel in a given scan to display. Instead of picking a single channel (e.g., the middle channel), channels are selected in various embodiments based on an algorithm so that each scan results in a different channel's data being written to display 400. According to one example, if the current channel is $X_n$, then on a subsequent scan, the channel with the highest score for interest (e.g., after a check for largest single depth bin value) is set as the target channel T. However rather than simply changing to channel T, the value of $X_n$ is added to or subtracted from by the value F, wherein F is given by Equation 1.

$$F=\text{(the number of channels)}/24 \text{ or } F=|X_n-T| \text{ if } |X_n-T|<=1 \quad (1)$$

Thus, $X_{n+1}$ does not "jump" the full distance to T. This may help to avoid gross discontinuities in down-track B-scan 420. Down-track B-scan 420 then becomes an amalgamation of different channel scans one after another. The factor F is set arbitrarily as a value that minimizes discontinuities while at the same time traversing quickly enough to ensure that at least part of a given signal of interest is always displayed. The factor F can be changed automatically or manually, as desired.

If abrupt discontinuities are allowed, then HF noise (which could be caused by some periodic external interference) and other anomalies can threaten to pull focus away from items of interest. In some embodiments, F is chosen based on an expected mean deviation and it is set at a level so that the channel selection "slides" rather than "jumps." In one example, according to an embodiment, a scan is already on a mine, but HF noise appears in a subsequent scan. The channel selector will move to a channel that is closer to the HF noise but will come back toward the mine when the HF noise abates. This may help to keep focus near the mine in the face of HF noise.

In display 400, there are very few abrupt discontinuities between channel selections, and the majority of the mine information is clearly visible in samples 401 and in down-track B-scan 420. Further, in FIG. 4, channel indicator 402 denotes the channel being selected from the current scan.

FIG. 5 is an illustration of exemplary display 500 adapted according to one embodiment of the invention. As mentioned earlier, one or more prior art algorithms can be used in addition to the mathematical connection algorithm described above in order to eliminate or enhance the data. The additional use of such algorithms can also be applied to display techniques to create more meaningful displays. For example, display 500 corresponds to display 400 (FIG. 4) slightly advanced in time. Whereas the mine data in FIG. 4 was monochrome, mine data in FIG. 5 can be rendered so that it indicates an amount of confidence that can be had in each returned depth bin. A display unit uses the returned deviation information (discussed above) to indicate confidence values. Generally, a higher deviation from the background return corresponds to a higher confidence. The rectangles that make up samples 501 can then be colored according to the confidence associated with each. In one example, the color coding is made intuitive, such that higher confidence depth bins have higher color contrast with regard to scans 410 and 420. Additionally or alternatively, depth bins with higher confidence levels may be increased in size relative to other depth bins.

Color coding and increasing sizes of depth bins represent two reliable methods to make some depth bins stand out, thereby indicating high relevance. Additionally or alternatively, boxes (not shown) can be drawn around a group of depth bins, such as around items 401 or 501 of FIGS. 4 and 5. Such boxes can also be selectively generated based on deviations. For example, if a certain number of depth bins have a deviation that passes another threshold, a box may be rendered, thereby indicating very high relevance. Further, color coding of boxes can be used to indicate higher or lower relevance of the depth bins therein.

An advantage of displays 400 and 500 over various prior art displays, is that they are generally more intuitive to human operators. For instance, the 3D placement of samples 401 helps a human user to quickly judge the placement of an item of interest within the survey volume. Further, the positioning of mine samples with respect to down-track B-scan 420 can allow a human user to contrast samples 401 with relevant channels of past scans. This can assist in determining whether an indicated item is an item of interest or is a false positive (e.g., noise, utility pipes, and the like). Nevertheless, various embodiments may add, omit, or change some features of the displays shown in FIGS. 4 and 5. For example, it is possible to render down-track B-scan 420 and cross-track B-scan 410 from different vantage points. It is also possible to add a C-scan as a "floor" to the rectangular prism shown in those figures. In other words, various changes may be made to the illustrated embodiments without departing from the scope of the invention.

Figure 6:
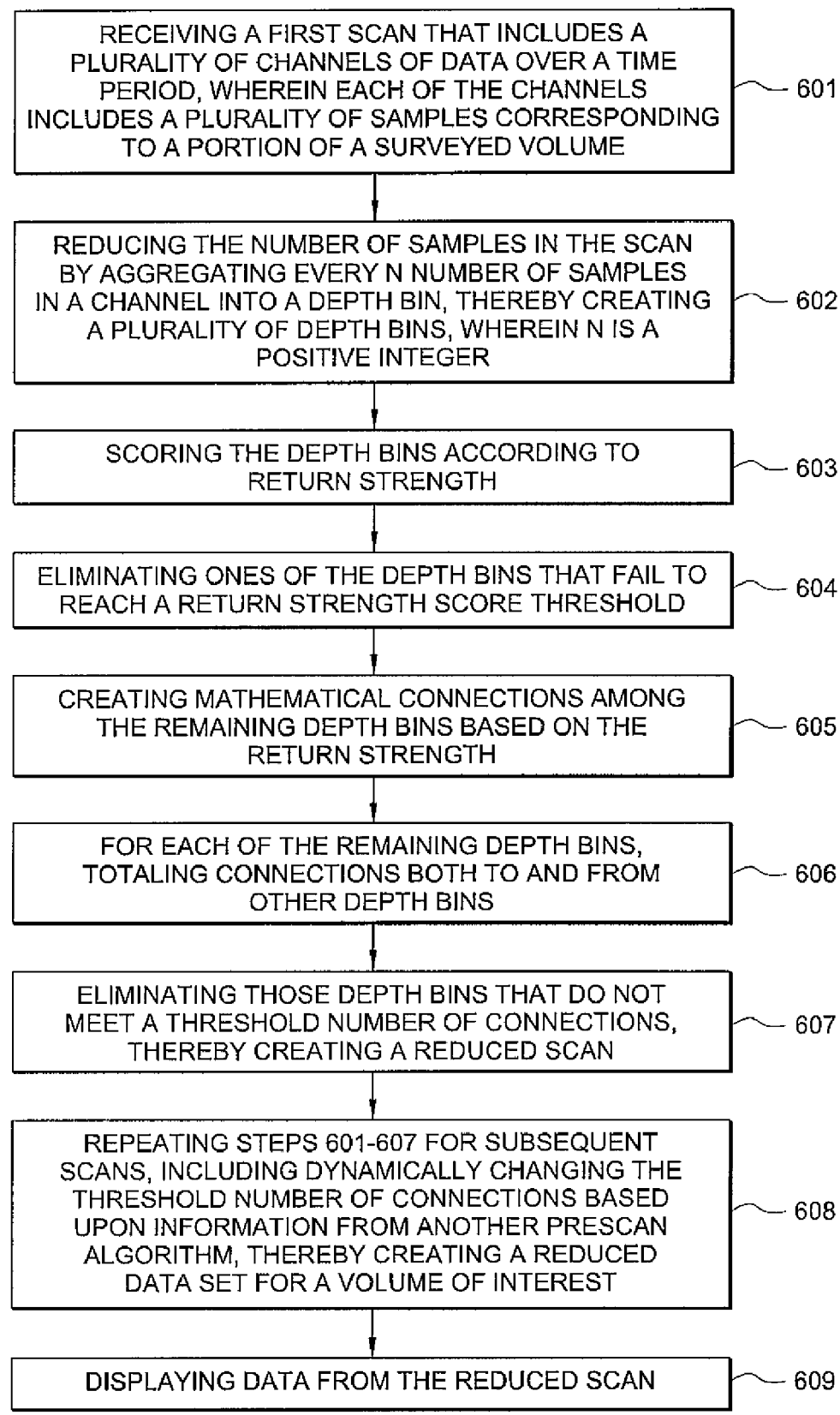
FIG. 6 is an illustration of an exemplary flow adapted according to one embodiment of the invention for analyzing and displaying radar data.

Various embodiments of the present invention can be thought of as processes of analyzing and displaying radar data. For instance, FIG. 6 is an illustration of exemplary flow 600 adapted according to one embodiment of the invention for analyzing and displaying radar data. The process represented by flow 600 may be performed, for example, by a computer or other processor-based device that is part of a radar system.

In step 601, a first scan is received that includes a plurality of channels of data over a time period, wherein each of the channels includes a plurality of samples corresponding to a portion of a surveyed volume. In step 602, the number of samples in the scan are reduced by aggregating every N number of samples in a channel into a depth bin, thereby creating a plurality of depth bins. N is a positive integer, such as five, ten, or twenty, and may be higher than twenty or lower than five, depending upon the application.

In step 603, the depth bins are scored according to return strength. For example, a higher score may indicate a higher return strength. A higher return strength generally indicates a higher relevance of a piece of data, especially when searching for items that are expected to reflect electromagnetic waves. In some examples, the score may be normalized to account for expected attenuation for deeper samples. Further, the scoring can be set to any index, such as in relation to mean background return strength, such that a score of one corresponds to an average return.

In step 604, ones of the depth bins that fail to reach a return strength score threshold are eliminated. This helps to eliminate items that are generally not expected to be relevant.

In step 605, mathematical connections are created among the remaining depth bins based on the return strength. Since the return strength of a depth bin determines the spherical radial distance allowed for identifying connections, a higher value will generally allow connections to a much larger number of other depth bins. Connections are not only made within a 2D scan, but are also made among nearby scans, so that the connections span three dimensions. In some embodiments, a delay list is used to allow connection to future scans without requiring a variable lag in displaying the data.

In step 606, for each of the remaining depth bins, connections both to and from other depth bins are totaled. In step 607, those depth bins that do not meet a threshold number of connections are suppressed, thereby creating a reduced scan. The threshold can be adjusted dynamically, as described above.

In step 608, steps 601-607 are repeated for subsequent scans, including dynamically changing the connection threshold based upon information from another prescan algorithm (e.g., F1), thereby creating a reduced data set for the volume of interest.

In step 609, data are displayed from the reduced scans. Example displays include those shown in FIGS. 4 and 5. In many embodiments, the displays are provided in real-time.

Figure 7:
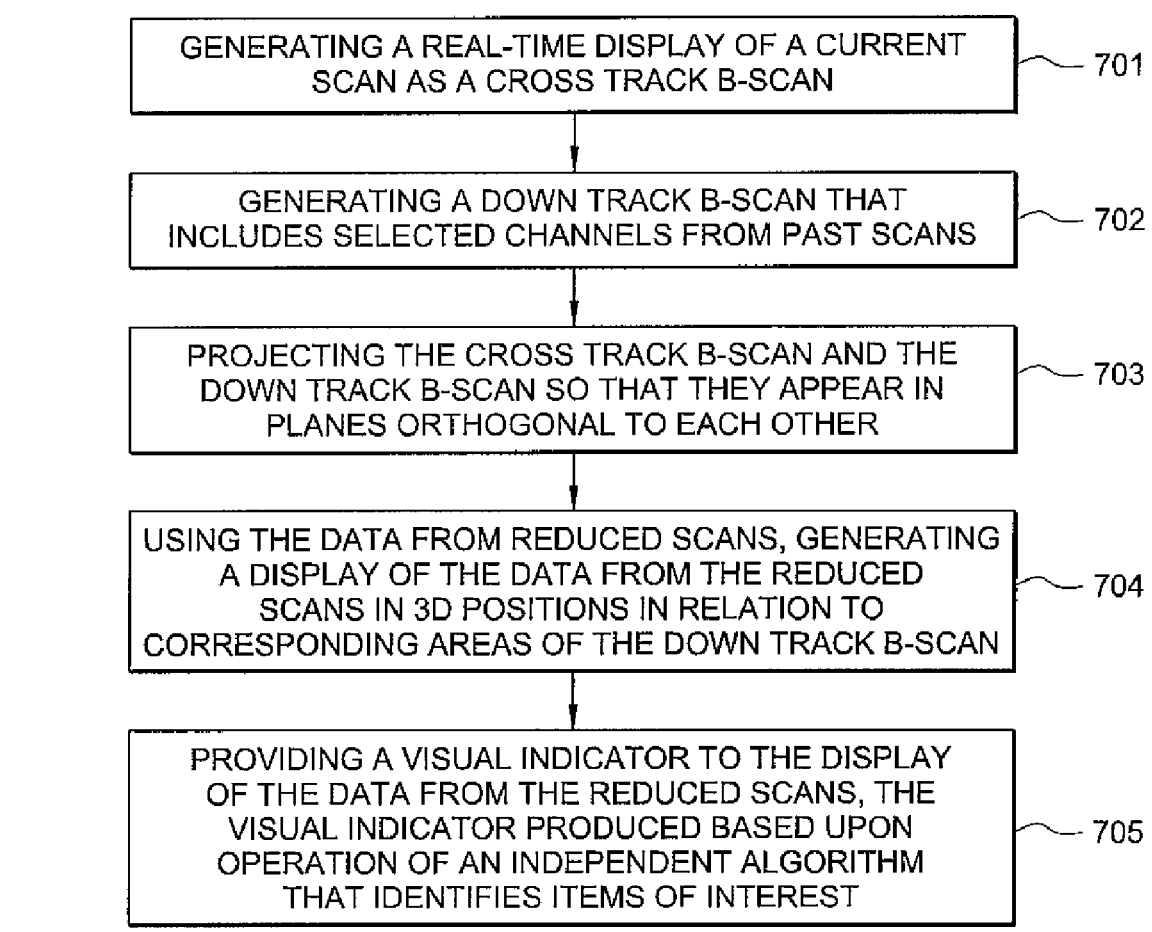
FIG. 7 is an illustration of an exemplary flow adapted according to one embodiment of the invention for displaying radar data.

FIG. 7 is an illustration of exemplary flow 700 adapted according to one embodiment of the invention for displaying radar data. The process represented by flow 700 may be performed, for example, by a computer or other processor-based device that is part of a radar system. In step 701, a real-time display of a current scan as a cross-track B-scan is generated. In step 702, a down-track B-scan is generated, and it includes selected channels from past scans. Step 702 may include selecting a channel from each of said scans as the scans are generated. The selecting can include identifying a channel with a relatively strong depth bin in a current scan and using a sliding algorithm to select a channel that lies between the identified channel and a channel identified in a previous scan.

In step 703, the cross-track B-scan and the down-track B-scan are projected so that they appear in planes orthogonal to each other, such an arrangement can be seen in FIGS. 4 and 5.

In step 704, using the data from reduced scans, a display of the data from the reduced scans is generated in 3D positions in relation to corresponding areas of the down-track B-scan. In some embodiments, the 3D placement of the displayed data also corresponds to the location of the data within the survey volume.

In step 705, a visual indicator is provided to the display of the data from the reduced scans. The visual indicator is produced based upon operation of an independent algorithm (e.g., F1) that identifies items of interest.

Methods 600 and 700 are shown as series of discrete steps. However, other embodiments of the invention may add, delete, repeat, modify and/or rearrange various portions of methods 600 and 700. For example, steps 701-705 may be performed at or near the same time. In fact, the various components of the display may be rendered in any order.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like). In fact, readable media can include any medium that can store or transfer information.

Figure 8:
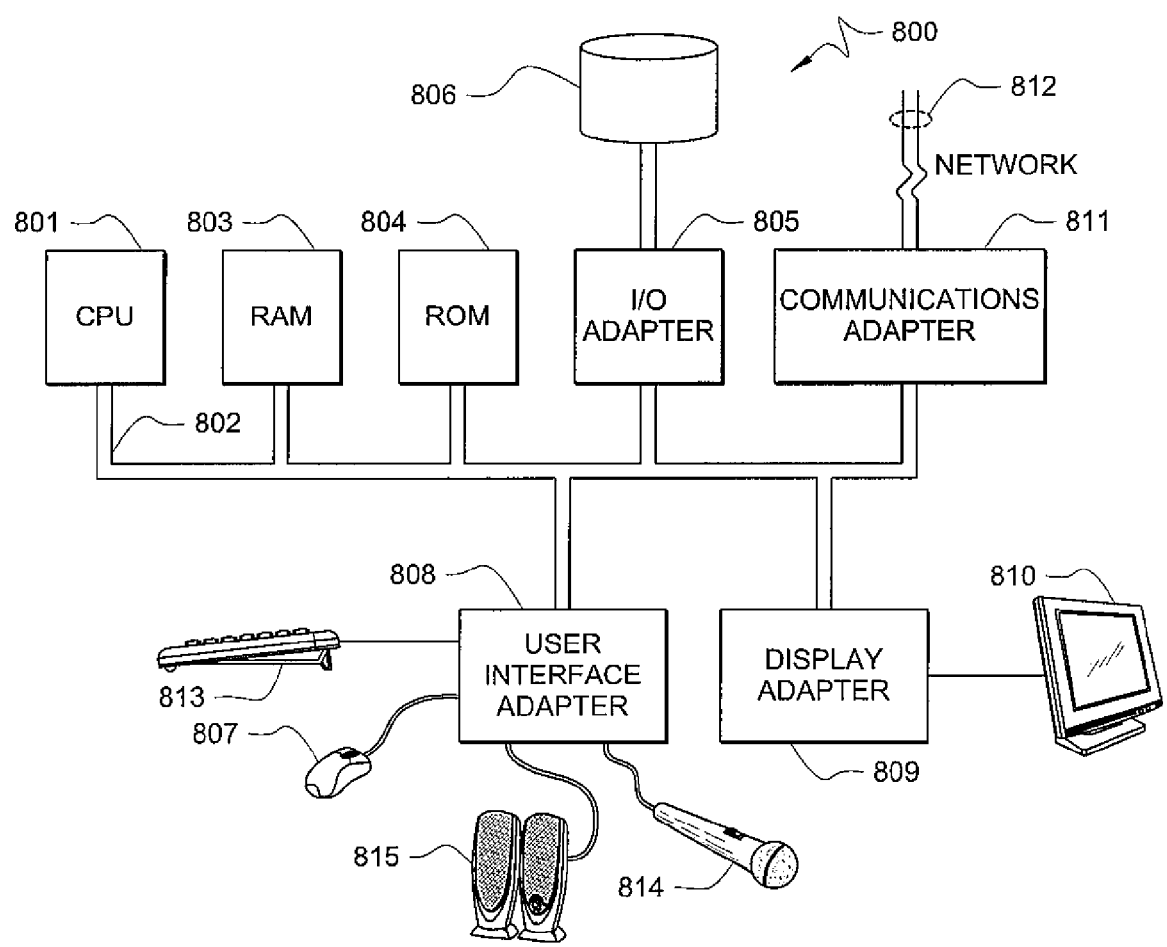
FIG. 8 illustrates an example computer system 800 adapted according to embodiments of the present invention.

FIG. 8 illustrates an example computer system 800 adapted according to embodiments of the present invention. That is, computer system 800 comprises an example system on which embodiments of the present invention may be implemented (such as a computer in a vehicle-based GPR system). Central processing unit (CPU) 801 is coupled to system bus 802. CPU 801 may be any general purpose CPU. However, the present invention is not restricted by the architecture of CPU 801 as long as CPU 801 supports the inventive operations as described herein. CPU 801 may execute the various logical instructions according to embodiments of the present invention. For example, CPU 801 may execute machine-level instructions according to the exemplary operational flows described above in conjunction with FIGS. 6 and 7.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as instructions to change a vantage point, to apply color coding to data, or the like.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing radar and program data. Communications adapter 811 is preferably adapted to couple computer system 800 to network 812 (e.g., the Internet, a wireless network, or other network). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display the user interface (such as that of FIGS. 4 and 5) of embodiments of the present invention.

It shall be appreciated that the present invention is not limited to the architecture of system 800. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention. In fact, various embodiments of the invention are not limited to military applications or vehicle based applications and may find use in, e.g., archaeology, construction, and/or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for displaying radar images, said method comprising:

receiving a first scan that includes a plurality of channels of data over a time period, wherein each of said channels includes a plurality of samples corresponding to a portion of a surveyed volume;

reducing the number of samples in said scan by aggregating every N number of samples in a channel into a depth bin, thereby creating a plurality of depth bins, wherein N is a positive integer;

scoring said depth bins according to return strength;

creating mathematical connections among the depth bins based on said return strength, wherein depth bins with stronger returns are assigned a greater radial distance in which to connect to nearby depth bins;

for each of said depth bins, totaling connections both to and from other depth bins;

eliminating those depth bins that do not meet a threshold number of connections, thereby creating a reduced scan; and displaying data from said reduced scan.

2. The method of claim 1 further comprising:

receiving subsequent scans, and for each of said subsequent scans:

creating additional depth bins;

creating mathematical connections among the depth bins in said first scan and nearby scans; and eliminating those depth bins that do not meet a threshold number of connections, thereby creating a reduced scan for each of said subsequent scans.

3. The method of claim 1 wherein creating mathematical connections comprises:

for each bin that has one or more potential connections to bins in one or more subsequent scans, storing its state in a delay file and creating connections from said potential connections after depth bins of said subsequent scans are created.

4. The method of claim 1 further comprising:

changing said threshold number of connections based on data gathered from an independent process analyzing said scan.

5. The method of claim 4 wherein said changing said threshold number comprises:

increasing said threshold when said independent process ascertains that some depth bins show decreasing deviation; and decreasing said threshold when said independent process ascertains that some depth bins show increasing deviation.

6. The method of claim 5 wherein said independent process comprises:

an algorithm for creating a Two-Dimensional (2D) map view of said surveyed volume.

7. The method of claim 1 wherein said displaying comprises:

generating a real-time, Three-Dimensional (3D) view of said surveyed volume and depth.

8. The method of claim 1 wherein said data is data from a Ground Penetrating Radar (GPR) system.

9. The method of claim 1 wherein said displaying said data comprises:

generating a real-time display of a current scan as a cross-track B-scan; and generating a down-track B-scan that includes selected channels from past scans;

projecting said cross-track B-scan and said down-track B-scan so that they appear in planes orthogonal to each other; and using said data from said reduced scan and from said past scans, reduced in the same manner as said first scan, generating a display of the data from said reduced scans in Three-Dimensional (3D) positions in relation to corresponding areas of said down-track B-scan.

10. The method of claim 9 wherein generating said down-track B-scan comprises:

selecting a channel from each of said scans as said scans are generated, wherein said selecting includes identifying a channel with a relatively strong depth bin in a current scan and using a sliding algorithm to select a channel that lies between said identified channel and a channel identified in a previous scan.

11. The method of claim 9 further comprising:

providing a visual indicator to said display of the data from said reduced scans, said visual indicator drawing attention to depth bins with relatively high relevance, said visual indicator produced based upon operation of an independent algorithm that identifies items of interest.

12. The method of claim 1 further comprising:

before creating said mathematical connections, eliminating ones of said depth bins that fail to reach a return strength score threshold.

13. A system for analyzing and displaying radar information, said system comprising:

a transmit and receive unit operable to transmit radar signals to a survey volume and to receive returned radar signals;

a processing unit operable to:

receive radar data from said returned radar signals;

reduce said data into depth bins, each with a score based on received signal strength;

create connections among depth bins based on respective scores; and eliminate ones of said depth bins that do not meet a threshold number of connections; and a display unit operable to create a Three-Dimensional (3D) display of at least a subset of said depth bins that are not eliminated by said processing unit.

14. The system of claim 13, wherein said 3D display includes a cross-track B-scan display of a current scan.

15. The system of claim 14 wherein said 3D display further includes a down-track B-scan display of channels of past scans, each of said channels selected based, at least in part, on return signal strength.

16. The system of claim 15, wherein said down-track B-scan display and said cross-track B-scan display are arranged in orthogonal planes to create a portion of a rectangular prism, and wherein said data bins are displayed within said rectangular prism.

17. The system of claim 13 wherein a visual indicator is further provided to said 3D display to highlight said depth bins that were not eliminated.

18. The system of claim 13, wherein said system is integrated into a vehicle to perform a radar survey of a portion of the ground.

19. A computer program product having a computer readable medium having computer program logic recorded thereon for processing radar information, said computer program product comprising:

(a) code, when executed by a computer, receiving digital data representing returned radar signals;

(b) code, when executed by a computer, creating depth bins from said digital data and scoring each of said depth bins based on returned signal strength;

(c) code, when executed by a computer, creating relationships among said depth bins represented by connections therebetween, said connections based on said scoring;

(d) code, when executed by a computer, eliminating ones of said depth bins based on said connections; and (e) code, when executed by a computer, displaying ones of said depth bins that are not eliminated.

20. The computer program product of claim 19 wherein said code eliminating ones of said depth bins further comprises:

code, when executed by a computer, receiving data from an independent radar algorithm and using said data received from said algorithm to adjust a threshold number of connections; and code, when executed by a computer, comparing scores of each of depth bins to said threshold number of connections.

21. A computer program product having a computer readable medium having computer program logic recorded thereon for displaying radar information, said computer program product comprising:

(a) code, when executed by a computer, receiving radar data representing scans of a surveyed volume as said scans are generated; and (b) code, when executed by a computer, rendering a down-track B-scan display including portions of previous scans; wherein said rendering code includes:

code, when executed by a computer, selecting a channel from each of said scans as said scans are generated, wherein said selecting includes identifying a channel with a relatively strong depth bin in a current scan and using a sliding algorithm to select a channel that lies between said identified channel and a channel identified in a previous scan.

22. The computer program product of claim 21 further comprising:

code, when executed by a computer, generating a real-time display of a current scan as a cross-track B-scan; and code, when executed by a computer, projecting said cross-track B-scan and said down-track B-scan so that they appear as orthogonal of a portion of a rectangular prism.

* * * * *